(12) United States Patent
Nishino et al.

(10) Patent No.: US 8,767,161 B2
(45) Date of Patent: Jul. 1, 2014

(54) DISPLAY DEVICE

(75) Inventors: Tomonori Nishino, Mobara (JP); Nobuyuki Ishige, Shirako (JP)

(73) Assignee: Japan Display Inc., Tokyo (JP)

( * ) Notice: Subject to any disclaimer, the term of this patent is extended or adjusted under 35 U.S.C. 154(b) by 19 days.

(21) Appl. No.: 13/356,688

(22) Filed: Jan. 24, 2012

(65) Prior Publication Data
US 2012/0188498 A1 Jul. 26, 2012

(30) Foreign Application Priority Data

Jan. 26, 2011 (JP) ................... 2011-014113

(51) Int. Cl.
*G02F 1/1345* (2006.01)
(52) U.S. Cl.
USPC .......................... 349/152; 349/122
(58) Field of Classification Search
USPC .................. 349/149, 152
See application file for complete search history.

(56) References Cited

U.S. PATENT DOCUMENTS

| 5,621,556 A | 4/1997 | Fulks et al. |
| 5,835,177 A * | 11/1998 | Dohjo et al. ............. 349/147 |
| 6,934,000 B1 * | 8/2005 | Ishii et al. ............... 349/149 |

* cited by examiner

*Primary Examiner* — Richard Kim
(74) *Attorney, Agent, or Firm* — Antonelli, Terry, Stout & Kraus, LLP.

(57) ABSTRACT

Signal lines include a first signal line, a second signal line formed on the first signal line via a first insulating film, and a transparent conductive film formed on the second signal line via a second insulating layer. The transparent conductive film is formed so as to cover a first connection hole which penetrates to the first signal line through the first insulating layer and the second insulating layer and a second connection hole which penetrates to the second signal line through the second insulating layer. A recess portion formed in the first insulating layer and/or the second insulating layer is disposed between the connection hole close to the side edge portion of the substrate of the first and second connection holes. The side edge portion of the transparent conductive film extends to a bottom of the recess portion.

13 Claims, 11 Drawing Sheets

DISPLAY DEVICE

CROSS-REFERENCE TO RELATED APPLICATION

The present application claims priority from Japanese application JP 2011-014113 filed on Jan. 26, 2011, the content of which is hereby incorporated by reference into this application.

BACKGROUND OF THE INVENTION

1. Field of the Invention

The present invention relates to a display device, and more particularly to a routing wire disposed on a peripheral portion of a display region.

2. Description of the Related Art

A display device in the related art has a configuration where scanning signal lines (gate lines) extending in the X direction and arranged parallel to each other in the Y direction and image signal lines (drain lines) extending in the Y direction and arranged parallel to each other in the X direction are formed on a substrate; pixels formed by thin film transistors and pixel electrodes connected to corresponding thin film transistors are formed in a region surrounded by the scanning signal lines and the image signal lines; and plural pixels are arranged in a matrix in a display region. In the display device with such a configuration, a scanning signal line driving circuit for supplying scanning signals (gate signals) to the scanning signal lines, an image signal line driving circuit for supplying image signals to the image signal lines, and the like are disposed on side portions of the substrate. The driving circuits, the scanning signal lines, and the image signal lines are electrically connected to each other by routing wires formed at a so-called bezel region between the display region and the end portions of the substrate.

It is known that occurrence of signal delays or the like in the scanning signal lines, the image signal lines, and the routing wires has great influence on display quality, and they are formed using metal thin films in order to suppress the occurrence of signal delays or the like as much as possible. In the display device using the metal thin films, as in a liquid crystal display of the IPS type, the scanning signal lines and the routing wires are formed in different processes, and the scanning signal lines and the routing wires are electrically connected to each other by providing contact holes overlapping the respective wires on an insulating layer formed to be an upper layer of the scanning signal lines and the routing wires and by providing a transparent conductive film to be an upper layer of the insulating layer (for example, refer to U.S. Pat. No. 5,621,556).

However, in the display device in the related art, a region (connection region) where the contact holes for electrically connecting the scanning signal lines to the routing wires are formed is generally formed in the bezel region in consideration of the influence on display quality. In the bezel region, as shown in FIG. 11A which is a plan view illustrating a connection region and FIG. 11B which is a cross-sectional view taken along the line XIB-XIB in FIG. 11A, in a region where an end portion of a scanning signal line DCR and an end portion of a routing wire GAL formed on a surface of a first substrate SUB1 are close to each other, a first connection hole (first contact hole) TH1 is formed in a first insulating layer PAS1 which is formed to be an upper layer of the routing wire GAL, and a second connection hole (second contact hole) TH2 is formed in the first insulating layer PAS1 and the second insulating layer PAS2 sequentially formed to be an upper layer of the scanning signal line DCR. In the connection region, for example, a transparent conductive film CHL is formed to be an upper layer of the second insulating layer PAS2 so as to cover the first connection hole TH1 and the second connection hole TH2, for example, in a process of forming pixel electrodes, and the scanning signal line DCR is electrically connected to the routing wire GAL via the transparent conductive film CHL.

In the display device having the configuration, as shown in FIGS. 11A and 11B, the end portion of the transparent conductive film CHL is open on the second insulating layer PAS2. For this reason, as shown in FIG. 11B, in a case where an impurity such as moisture permeates through the interface between the second insulating layer PAS2 and the transparent conductive film CHL as indicated by the arrow N, the permeating impurity such as moisture reaches the first connection hole TH1 along the interface between the second insulating layer PAS2 functioning as a planarization film and the transparent conductive film CHL, then further permeates along the side wall surface thereof, and easily reaches a connection region P between the transparent conductive film CHL and the routing wire GAL. Therefore, there is concern that the impurity may corrode the routing wire GAL formed of a metal thin film, and thus a signal line from the scanning signal driving circuit to the scanning signal line DCR via the routing wire GAL may be disconnected.

Particularly, since thermal expansion coefficients of the metal thin film and the first and second insulating layers PAS1 and PAS2 are different from those of the transparent conductive film CHL and thus there is a higher possibility that foreign matter (impurities) such as moisture may permeate, countermeasures thereof are in considerable demand.

The present invention is made in consideration of these problems, and an object of the present invention is to provide a technique which prevents foreign matter such as moisture from permeating through an interface between a transparent conductive film and an underlying insulating film so as to improve the reliability of a connection region of signal lines, thereby improving reliability of a display device.

SUMMARY OF THE INVENTION

According to an aspect of the present invention, there is provided a display device including a display region where display pixels are arranged in a matrix on a substrate; a terminal section that is disposed at a side portion of the substrate; and signal lines that are disposed via a region between the display region and a side edge portion of the substrate and electrically connect the display pixels to the terminal section, wherein the signal lines include a first signal line formed close to the side edge of the substrate, a second signal line formed on the first signal line via a first insulating film, and a transparent conductive film formed on the second signal line via a second insulating layer and electrically connecting the first signal line to the second signal line, wherein the transparent conductive film is formed so as to cover a first connection hole which penetrates to the first signal line through the first insulating layer and the second insulating layer and a second connection hole which penetrates to the second signal line through the second insulating layer, wherein a recess portion is formed in the first insulating layer and/or the second insulating layer, and wherein the recess portion is disposed between the connection hole close to the side edge portion of the substrate of the first and second connection holes, and the side edge portion of the substrate, and at least a part of the side edge portion of the transparent conductive film extends to a bottom of the recess portion.

According to the embodiment of the present invention, it is possible to prevent foreign matter such as moisture from permeating through an interface between a transparent conductive film and an underlying insulating film so as to improve the reliability of a connection region of signal lines, thereby improving reliability of a display device.

DETAILED DESCRIPTION OF THE INVENTION

Figure 1:
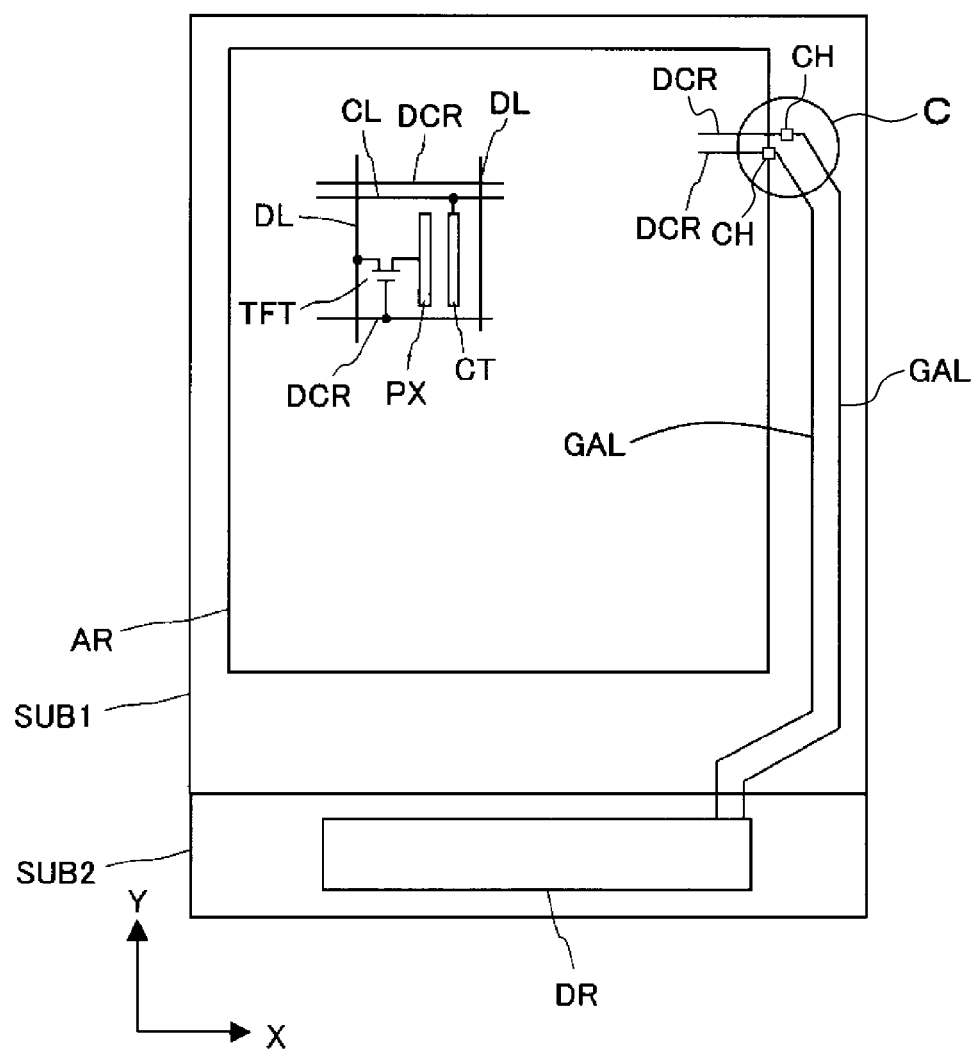
FIG. 1 is a diagram illustrating an overall configuration of a liquid crystal display which is a display device according to a first embodiment of the present invention.

Hereinafter, embodiments of the present invention will be described with reference to the accompanying drawings. However, in the following description, the same constituent elements are given the same reference numerals, and repeated description will be omitted. In addition, in the drawings, X and Y respectively indicate the X axis and the Y axis. In addition, each thin film layer such as a recess portion DCH or a barrier layer BAL can be formed using a well-known photolithography technique, and detailed description of a formation method thereof will be omitted.

First Embodiment

Overall Configuration

FIG. 1 is a diagram illustrating an overall configuration of a liquid crystal display which is a display device according to a first embodiment of the present invention, and an overall configuration of the display device according to the first embodiment will be described with reference to FIG. 1. Although, in the following description, a case where the present invention is applied to an IPS (In-Plane Switching) type liquid crystal display is described, the present invention is applicable to a TN (Twisted Nematic) type or VA (Vertical Alignment) type liquid crystal display, or the like. In addition, the present invention is not limited to a non-emission type display device, and, is applicable to, for example, a self-emission type display device such as an organic EL display device.

In addition, although, in the following description, a case where indium oxide-based ITO (Indium Tin Oxide) is used as a transparent conductive film is described, the present invention is not limited thereto, and, for example, zinc oxide (ZnO)-based AZO (Aluminum doped Zinc Oxide) or GZO (Gallium doped Zinc Oxide), or tin oxide-based transparent conductive film materials may be used.

As shown in FIG. 1, the liquid crystal display according to the first embodiment includes a liquid crystal display panel having a first substrate SUB1 provided with pixel electrodes PX, thin film transistors TFT, and the like, a second substrate SUB2 provided with color filters and black matrices (not shown) and disposed so as to be opposite to the first substrate SUB1, and a liquid crystal layer interposed between the first substrate SUB1 and the second substrate SUB2. The liquid crystal display is manufactured by assembling the liquid crystal display panel with a backlight unit (backlight device) (not shown) which is a light source of the liquid crystal display panel. The first substrate SUB1 and the second substrate SUB2 are fixed to each other with seal materials which are coated on the peripheral portion of the second substrate in a ring shape, and the liquid crystal is also sealed. In addition, the second substrate SUB2 has an area smaller than the first substrate SUB1, and exposes the lower side portion of the first substrate SUB1 in the figure. A driving circuit DR formed by semiconductor chips is mounted on the side portion of the first substrate SUB1. The driving circuit DR drives the pixels arranged in a display region AR. In addition, in the following description, there are cases where a liquid crystal display is denoted even in a description of the liquid crystal display panel.

In relation to the first substrate SUB1 and the second substrate SUB2, for example, a well-known glass substrate is generally used as a base material; however, the present invention is not limited to the glass substrate, and other insulating substrates such as quartz glass or plastic (resin) may be used. For example, if the quartz glass is used, since the process temperature can be heightened, the gate insulating layer of the thin film transistor TFT can be refined, and thereby reliability can be improved. On the other hand, if the plastic (resin) substrate is used, it is possible to provide a liquid crystal display with light weight and excellent shock resistance.

In addition, in the liquid crystal display according to the first embodiment, a region provided with display pixels (hereinafter, simply referred to as pixels) of the region where the liquid crystal is sealed, is the display region AR. Therefore, even in the region where the liquid crystal is sealed, a region where the pixels are not formed and which is not related to display is not the display region AR.

In the liquid crystal display according to the first embodiment, in the display region AR corresponding to the surface of the first substrate SUB1 on the liquid crystal side, scanning signal lines (gate lines) DCR, extending in the X direction of FIG. 1 and arranged in parallel to each other in the Y direction, and supplied with scanning signals from the driving circuit DR, are formed. In addition, image signal lines (drain lines) DL, extending in the Y direction of FIG. 1 and arranged in parallel to each other in the X direction, and supplied with image signals (grayscale signals) from the driving circuit, are formed. The image signal lines DL and the scanning signal lines DCR are formed using, for example, a metal thin film such as aluminum, but may be formed using a conductive film made of other conductive materials. A rectangular region surrounded by the image signal lines DL and the scanning signal lines DCR form regions where the pixels are formed (hereinafter, referred to as pixel regions), and thereby the pixels are arranged in a matrix in the display region AR. Each of the pixels includes, for example, as shown in FIG. 1, the thin film transistor TFT which is turned on and off by a scanning signal from the scanning signal line DCR, the pixel electrode PX which is supplied with an image signal from the image signal line DL via a turned-on thin film transistor TFT, and a common electrode CT which is formed at least on the entire surface of the display region and is supplied with a common signal having a potential which is a reference with respect to a potential of the image signal, via a common line CL from one end of the left and right in the X direction (end portions of the first substrate SUB1), or both sides thereof. Here, the thin film transistor TFT is a thin film transistor with a so-called inverse staggered structure, and is driven such that a drain electrode and a source electrode are changed due to a bias application; however, in the present specification, for convenience, an electrode connected to the image signal line DL is a drain electrode DT, and an electrode connected to the pixel electrode PX is a source electrode ST.

An electric field having a component parallel to the main surface of the first substrate SUB1 is generated between the pixel electrode PX and the common electrode CT, and liquid crystal molecules are driven by the electric field. It is known that the liquid crystal display can perform so-called wide viewing angle display, and the liquid crystal display is called an IPS type because of singularity of the application of an electric field to the liquid crystal. In addition, the liquid crystal display with such a configuration performs display in a normally black display form where light transmittance is the minimum (black display) in a case where the electric field is not applied to the liquid crystal, and the light transmittance is gradually increased by applying the electric field.

As shown in FIG. 1, each image signal line DL and each scanning signal line DCR are respectively electrically connected to a routing wire GAL formed of a metal thin film such as, for example, aluminum, in a contact region (connection region) CH of the right end portion of FIG. 1. Each routing wire GAL is formed in the right side portion of the first substrate SUB1 of FIG. 1, that is, in the right bezel region of FIG. 1 of bezel regions which are regions between the display region AR and the edge sides of the first substrate SUB1. The routing wires GAL formed in the bezel region extend in the Y direction and are arranged in parallel to each other in the X direction, and one end of each thereof is connected to the scanning signal line DCR and the other end is connected to the driving circuit DR in the contact region CH. A configuration of the contact region CH will be described in detail later. In addition, the routing wire GAL is not limited to the metal thin film, and may be formed of a conductive film made of other conductive materials.

The driving circuit DR generates driving signals such as image signals and scanning signals based on an input signal from an external system via a flexible printed board (not shown). Although the liquid crystal display according to the first embodiment has the configuration where the driving circuit DR is formed using semiconductor chips and is mounted on the first substrate SUB1, there may be a configuration where one or both of an image signal driving circuit for outputting image signals and a scanning signal driving circuit for outputting scanning signals are mounted on a flexible printed board in a tape carrier type or a COF (Chip On Film) type so as to be connected to the first substrate SUB1.

In addition, although the liquid crystal display according to the first embodiment has the configuration where the common electrode CT is formed at least on the entire surface of the display region AR, the present invention is not limited thereto, and, for example, there may be a configuration where a common signal is input to the common electrode CT which is formed independently for each pixel, via the common line CL.

Configuration of Contact Region

Figure 2A:
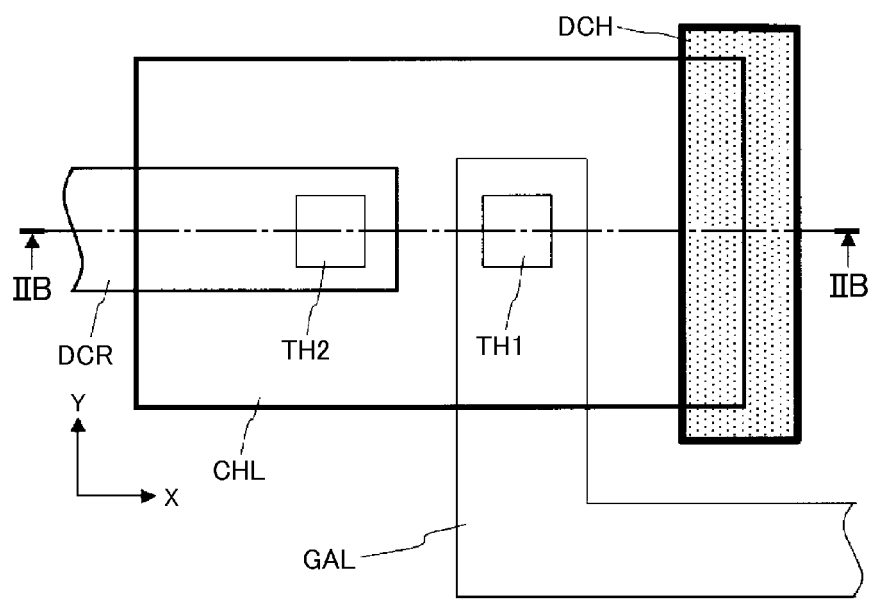
FIG. 2A is a plan view illustrating a schematic configuration of a contact region in the liquid crystal display according to the first embodiment of the present invention.
Figure 2B:
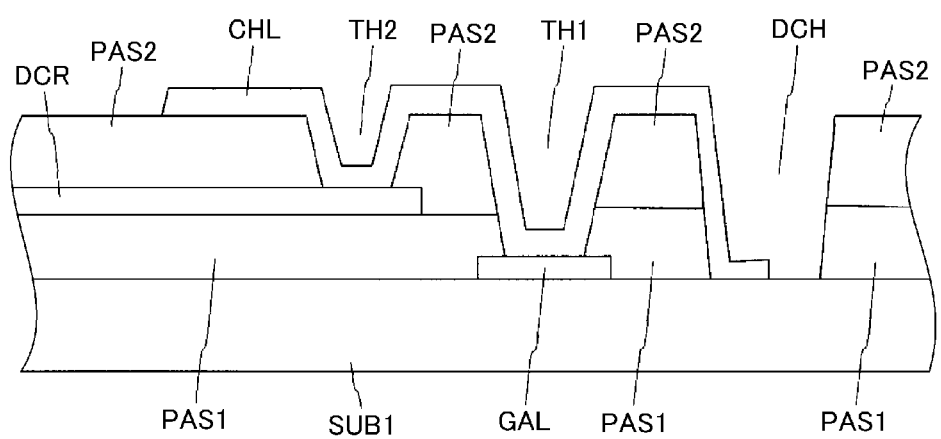
FIG. 2B is a cross-sectional view illustrating a schematic configuration of the contact region in the liquid crystal display according to the first embodiment of the present invention.

FIGS. 2A and 2B are diagrams illustrating a schematic configuration of a contact region in the liquid crystal display according to the first embodiment of the present invention, where FIG. 2A is a plan view which enlarges the contact region formed on the first substrate, and FIG. 2B is a cross-sectional view taken along the line IIB-IIB of FIG. 2A. Here, in FIGS. 2A and 2B, the right parts of the figures indicate parts close to the end portion of the first substrate SUB1. In addition, in the following, description of a protection layer called an underlayer formed on the surface of the first substrate SUB1 for preventing alkali ions or the like permeating through the first substrate SUB1 which is a glass substrate, an alignment layer for controlling an initial alignment direction of the liquid crystal molecules, and the like, will be omitted.

As is clear from FIG. 2A, in the liquid crystal display according to the first embodiment, a recess portion DCH is formed so as to include a side portion close to the end portion of the first substrate SUB1 of the side portions of the transparent conductive film CHL. At this time, the width of the recess portion DCH in the Y direction is formed so as to be greater than the width of the transparent conductive film CHL in the Y direction. In addition, the routing wire GAL is formed so as to extend from the connection hole (contact hole, a first connection hole) TH1 in the Y direction, and then extends in the X direction. That is to say, the routing wire GAL has a shape which bypasses the formation region of the recess portion DCH such that the recess portion DCH does not overlap the routing wire GAL. With such a shape, the recess portion DCH can be formed when the connection holes TH1 and TH2 are formed through etching of the insulating layers PAS1 and PAS2, and thereby it is possible to form the recess portion DCH without increasing the number of processes. In the region where the recess portion DCH is formed, the insulating layers PAS1 and PAS2 are etched up to the first substrate SUB1, and thus the routing wire GAL has a shape which bypasses the recess portion DCH.

In addition, in the first embodiment, two connection holes TH1 and TH2 are parallel to each other in the X direction which is an extending direction of the scanning signal line DCR, and the connection hole TH1 is formed close to the side edge portion of the first substrate SUB1. Therefore, in the first embodiment, of the side edge portions of the transparent conductive film CHL, the recess portion DCH is formed at the side edge portion of the right part of the figure formed between the connection hole TH1 and the side edge portion of the first substrate SUB1.

As shown in FIG. 2B, in the bezel region of the liquid crystal display according to the first embodiment, the routing wire GAL is formed on the first substrate SUB1, and the insulating layer (first insulating layer) PAS1 is formed thereon. The scanning signal line DCR is formed on the insulating layer PAS1, and the insulating layer (second insulating layer) PAS2 is formed on the scanning signal line DCR. As such, in the first embodiment, the routing wire GAL and the scanning signal line DCR are formed via the insulating layer PAS1, and the insulating layer PAS2 is formed on the scanning signal line DCR which is formed on the upper side.

In addition, the connection hole (contact hole, the second connection hole) TH2 penetrates through only the insulating layer PAS2 and reaches the surface of the scanning signal line DCR, and the connection hole TH1 penetrates through the insulating layer PAS1 and the insulating layer PAS2 and reaches the surface of the routing wire GAL. In addition, the recess portion DCH penetrates through the insulating layer PAS1 and the insulating layer PAS2, and reaches the surface of the first substrate SUB1. This is because a thin film layer which is an etching stopper is not formed at any lower layer of the insulating layer PAS1 and the insulating layer PAS2 in the region where the recess portion DCH is formed.

Therefore, the transparent conductive film CHL formed so as to include the formation regions of the two connection holes TH1 and TH2 is electrically connected to the scanning signal line DCR in the formation region of the connection hole TH2 and is electrically connected to the routing wire GAL in the formation region of the connection hole TH1, and, as a result, the scanning signal line DCR is electrically connected to the routing wire GAL via the transparent conductive film CHL.

On the other hand, in the recess portion DCH, the side edge portion of the transparent conductive film CHL is formed on the bottom of the recess portion DCH, that is, the surface of the first substrate SUB1. Therefore, for example, even if an impurity (foreign material) such as moisture permeates from the recess portion DCH of the transparent conductive film CHL, the permeating impurity such as moisture reaches the surface of the routing wire GAL after passing between the first substrate SUB1 and the transparent conductive film CHL, between the side wall surface of the recess portion DCH and the transparent conductive film CHL, between the insulating layer PAS2 and the transparent conductive film CHL, and the side wall surface of the connection hole TH1, that is, traveling the step difference in the normal direction of the first substrate SUB1. Thereby, a distance to the surface of the routing wire GAL can be increased, and the shape thereof becomes complicated. Therefore, it is possible to prevent an impurity such as moisture permeating from the recess portion DCH of the transparent conductive film CHL from easily reaching the surface of the routing wire GAL and corroding the routing wire GAL, and thus it is possible to improve the reliability of the liquid crystal display.

In addition, in the first embodiment, the routing wire GAL is laminated closer to the first substrate SUB1 than the scanning signal line DCR, that is, at the lower layer. With such a configuration, it is possible to form the routing wire GAL in the same process along with other wire layers formed in the display region AR. However, the scanning signal line DCR may be formed at a lower layer than the routing wire GAL. Particularly, in the first embodiment, the routing wire GAL and the recess portion DCH do not overlap each other, and thus the recess portion DCH may be formed with the same process as described above.

As described above, in the liquid crystal display according to the first embodiment, of the connection hole TH1 and the connection hole TH2, the recess portion DCH is formed in the region between the connection hole TH1 close to the side edge portion of the first substrate SUB1 and the side edge portion, and the side edge portion of the conductive thin film CHL which electrically connects the scanning signal line DCR to the routing wire GAL via the connection hole TH1 and the connection hole TH2 is formed on the bottom of the recess portion DCH, that is, the surface of the first substrate SUB1. Therefore, the step difference in the normal direction of the first substrate SUB1 is formed in the permeation pass of impurities such as moisture from the side edge portion of the conductive thin film CHL placed on the side edge portion side of the first substrate SUB1 to the connection hole TH1, and thus it is possible to make the permeation path complicated. As a result, even if an impurity such as moisture permeates from the side edge portion of the first substrate SUB1, the permeating impurity such as moisture can be prevented from easily reaching the connection hole TH1 from between the conductive thin film CHL and the underlying thin film thereof and thus the routing wire GAL can be prevented from being corroded in the formation part of the connection hole TH1. Therefore, it is possible to improve the reliability of the contact region, and, as a result, it is possible to improve the reliability of the liquid crystal display.

In addition, in the liquid crystal display according to the first embodiment, since the recess portion DCH is formed by etching the insulating layers PAS1 and PAS2, there can be achieved an effect that the step difference can be formed on the formation surface of the transparent conductive film CHL in the normal direction of the surface of the first substrate SUB1, that is, the direction where the thin film layers are laminated, without increasing the film thickness of the thin film layers formed on the surface of the first substrate SUB1.

In addition, although the Y direction width of the recess portion DCH is greater than the Y direction width of the transparent conductive film CHL in the liquid crystal display according to the first embodiment, the present invention is not limited thereto, the Y direction width of the recess portion DCH may be equal to or less than the Y direction width of the transparent conductive film CHL.

Second Embodiment

Figure 3A:
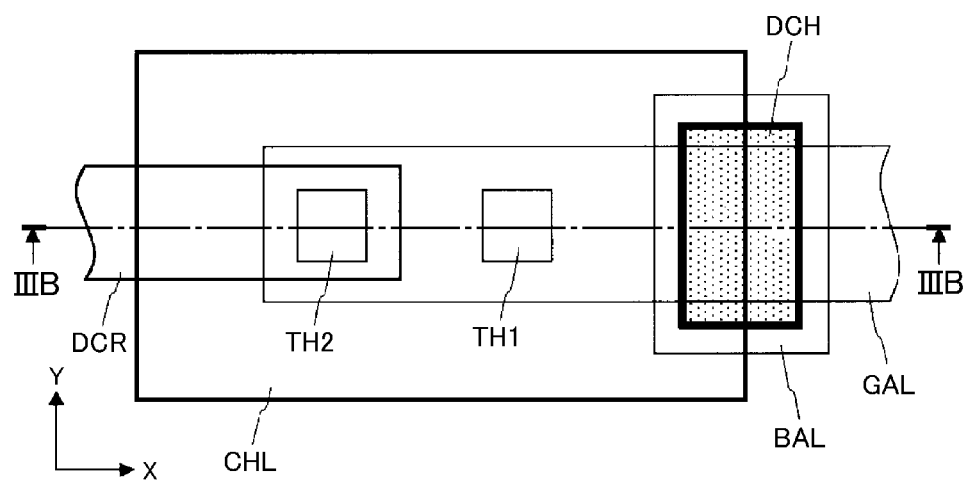
FIG. 3A is an enlarged view of a contact region in a liquid crystal display which is a display device according to a second embodiment of the present invention.
Figure 3B:
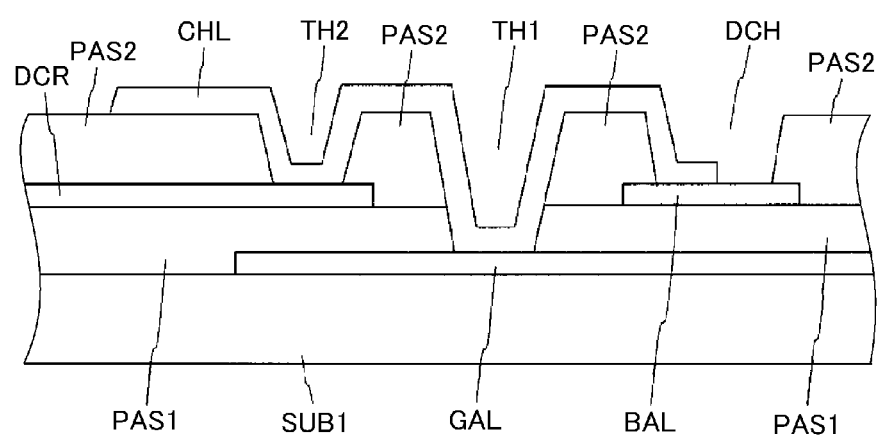
FIG. 3B is an enlarged view of the contact region in the liquid crystal display which is a display device according to the second embodiment of the present invention.

FIGS. 3A and 3B are enlarged views of a contact region in a liquid crystal display which is a display device according to the second embodiment of the present invention, where FIG. 3A is a plan view enlarging the contact region in the liquid crystal display according to the second embodiment, and FIG. 3B is a cross-sectional view taken along the line IIIB-IIIB shown in FIG. 3A. Here, the liquid crystal display according to the second embodiment has the same configuration as the configuration of the first embodiment except for a configuration of the contact region. Therefore, a configuration of the contact region will be described in detail in the following.

As is clear from FIG. 3A, in the liquid crystal display according to the second embodiment, in the same manner as the related art, the routing wire GAL extends in the same direction as the extending direction (X direction) of the scanning signal line DCR, and the end portion thereof on the display region side which is a left end portion in FIG. 3A extends toward the display region exceeding the connection hole TH2. In addition, in the liquid crystal display according to the second embodiment, the recess portion DCH is formed at a position where it overlaps the routing wire GAL, and a barrier layer BAL is formed in the region where it overlaps the recess portion DCH.

In the liquid crystal display according to the second embodiment, the Y direction width of the recess portion DCH is smaller than the Y direction width of the transparent conductive film CHL, the side edge portion of the transparent conductive film CHL close to the side edge portion of the first substrate SUB1 is located in the region where the recess portion DCH is formed in the X direction. In addition, the barrier layer BAL is formed in the region overlapping the recess portion DCH, and the barrier layer BAL is formed so as to overlap the routing wire GAL. Particularly, in the configuration of the second embodiment, the barrier layer BAL is a thin film layer functioning as an etching stopper when forming the recess portion DCH, and thus the planar size thereof is large in both the X direction and Y direction of the recess portion DCH.

As shown in FIG. 3B, in the liquid crystal display according to the second embodiment, the routing wire GAL is formed on the upper surface on the side edge portion side of the first substrate SUB1, and the insulating layer PAS1 is formed thereon. The scanning signal line DCR is formed on the insulating layer PAS2, and the barrier layer BAL is formed on the insulating layer PAS2 in the region where the recess portion DCH is formed. At this time, although the end portion of the routing wire GAL overlaps the end portion of the scanning signal line DCR in the second embodiment, the routing wire GAL overlaps the scanning signal line DCR via the insulating layer PAS1, and thus they are not directly connected to each other. Here, as a thin film material for forming the barrier layer BAL, a thin film material which functions as an etching stopper of the insulating layers PAS1 and PAS2, prevents corrosion by impurities such as moisture, and does not emit impurities to the liquid crystal, may be used, and, for example, ITO or the like for forming the conductive thin film CHL may be used. However, the material is not limited to the ITO, and may be other thin film materials functioning as an etching stopper when etching the insulating layers PAS1 and PAS2.

The insulating layer PAS2 is formed on the scanning signal line DCR and the barrier layer BAL, and the transparent conductive film CHL is formed on the insulating layer PAS2. At this time, in the second embodiment as well, the connection hole TH2 which is formed in the insulating layer PAS2 and penetrates to the scanning signal line DCR, the connection hole TH1 which penetrates to the routing wire GAL through the insulating layer PAS2 and the insulating layer PAS1, and the recess portion DCH which penetrates to the barrier layer BAL through the connection hole TH1 and the insulating layer PAS2, are formed. Therefore, in the same manner as the first embodiment, the scanning signal line DCR is electrically connected to the routing wire GAL via the transparent conductive film CHL.

In addition, of the side edge portions of the transparent conductive film CHL located close to the side edge portion of the first substrate SUB1, the side edge portion close to the connection hole TH1, that is, the side edge portion overlapping the recess portion DCH is located on the surface of the barrier layer BAL exposed from the insulating layer PAS2 which is a bottom of the recess portion DCH. On the other hand, of the side edge portions of the transparent conductive film CHL, the side edge portion which does not overlap the recess portion DCH is formed on the surface of the insulating layer PAS2 in the same manner as the related art.

As such, in the liquid crystal display according to the second embodiment as well, the side edge portion of the transparent conductive film CHL close to the connection hole TH1 is located on the bottom of the recess portion DCH, and thus it is possible to achieve the same effects as in the first embodiment.

In addition, in the liquid crystal display according to the second embodiment, since the recess portion DCH is also formed in a process for forming the connection holes TH1 and TH2, only the insulating layer PAS2 is etched through etching for forming the recess portion DCH and the underlying insulating layer PAS1 is not etched, by providing the barrier layer BAL in the second embodiment. With such a configuration, the recess portion DCH can be formed so as to overlap the routing wire GAL in the region where the recess portion DCH is formed. As a result, there can be an achievement of an exceptional effect that it is possible to prevent the contact region from being expanded in the Y direction due to the formation of the recess portion DCH without making the routing wire GAL bypass in the Y direction due to the formation of the recess portion DCH.

In addition, although, in the second embodiment, the Y direction width of the transparent conductive film CHL is greater than the Y direction width of the recess portion DCH, the present invention is not limited thereto, and the Y direction width of the recess portion DCH may be equal to or more than the Y direction width of the transparent conductive film CHL. Further, although the end portion of the scanning signal line DCR overlaps the end portion of the routing wire GAL in the X direction via the insulating layer PAS1, the present invention is not limited thereto, and, for example, as shown in the first embodiment, the front end portions thereof may not overlap each other in the X direction.

Third Embodiment

Figure 4A:
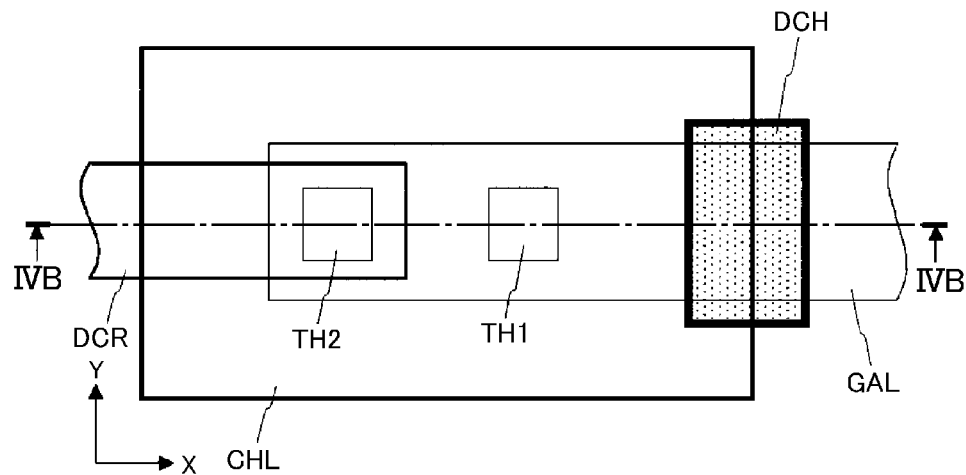
FIG. 4A is a plan view illustrating a schematic configuration of a contact region in a liquid crystal display which is a display device according to a third embodiment of the present invention.
Figure 4B:
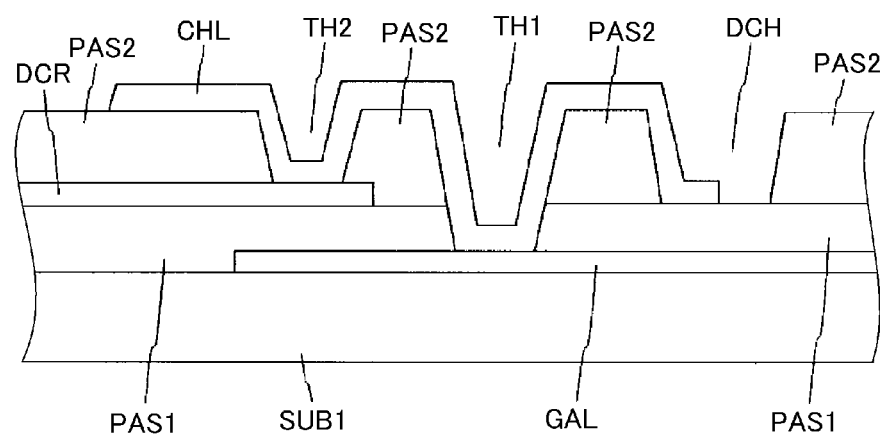
FIG. 4B is a cross-sectional view illustrating a schematic configuration of the contact region in the liquid crystal display which is a display device according to the third embodiment of the present invention.

FIGS. 4A and 4B are diagrams illustrating a configuration of a contact region in a liquid crystal display which is a display device according to a third embodiment of the present invention, where FIG. 4A is a plan view enlarging the contact region in the liquid crystal display according to the third embodiment, and FIG. 4B is a cross-sectional view taken along the line IVB-IVB shown in FIG. 4A. The liquid crystal display according to the third embodiment is different from the liquid crystal display according to the second embodiment only in a configuration of the recess portion DCH, and other configurations are the same as those of the liquid crystal display according to the second embodiment. Therefore, a configuration of the recess portion DCH will be described in detail in the following.

As is clear from FIG. 4A, in the liquid crystal display according to the third embodiment, a barrier layer BAL overlapping the recess portion DCH is not formed. That is to say, in the liquid crystal display according to the third embodiment, the recess portion DCH including a region overlapping the routing wire GAL is formed in the insulating layers PAS1 and PAS2 without forming the barrier layer BAL.

In other words, as shown in FIG. 4B, in the liquid crystal display according to the third embodiment, when the insulating layers PAS1 and PAS2 are etched to form the connection holes TH1 and TH2 and the recess portion DCH, for example, if the etching ends in the middle of the insulating layers PAS1 and PAS2 using a well-known halftone etching technique, the insulating layer PAS1 can remain on the bottom of the recess portion DCH.

With such a configuration, of the side edge portions of the transparent conductive film CHL located close to the side edge portion of the first substrate SUB1, the side edge portion close to the connection hole TH1, that is, the side edge portion overlapping the recess portion DCH is located on the surface of the insulating layer PAS1 exposed from the insulating layer PAS2 which is a bottom of the recess portion DCH. On the other hand, of the side edge portions of the transparent conductive film CHL, the side edge portion which does not overlap the recess portion DCH is formed on the surface of the insulating layer PAS2 in the same manner as the related art.

Therefore, in the liquid crystal display according to the third embodiment as well, the side edge portion of the transparent conductive film CHL close to the connection hole TH1 is located on the bottom of the recess portion DCH, and thus it is possible to achieve the same effects as in the second embodiment.

In addition, in the liquid crystal display according to the third embodiment, there can be an achievement of an exceptional effect that a barrier layer is not provided, and thus a process for forming the barrier layer can be omitted.

In addition, although, in the third embodiment, the Y direction width of the transparent conductive film CHL is greater than the Y direction width of the recess portion DCH, the present invention is not limited thereto, and the Y direction width of the recess portion DCH may be equal to or more than the Y direction width of the transparent conductive film CHL.

Further, although the end portion of the scanning signal line DCR overlaps the end portion of the routing wire GAL in the X direction via the insulating layer PAS1, the present invention is not limited thereto, and, for example, as shown in the first embodiment, the front end portions thereof may not overlap each other in the X direction.

Further, as shown in FIG. 4B, although only the insulating layer PAS2 is etched to form the recess portion DCH, the insulating layers PAS1 and PAS2 may be etched in the middle of the insulating layer PAS2 or up to the middle of the insulating layer PAS1 to form the recess portion DCH.

Fourth Embodiment

Figure 5A:
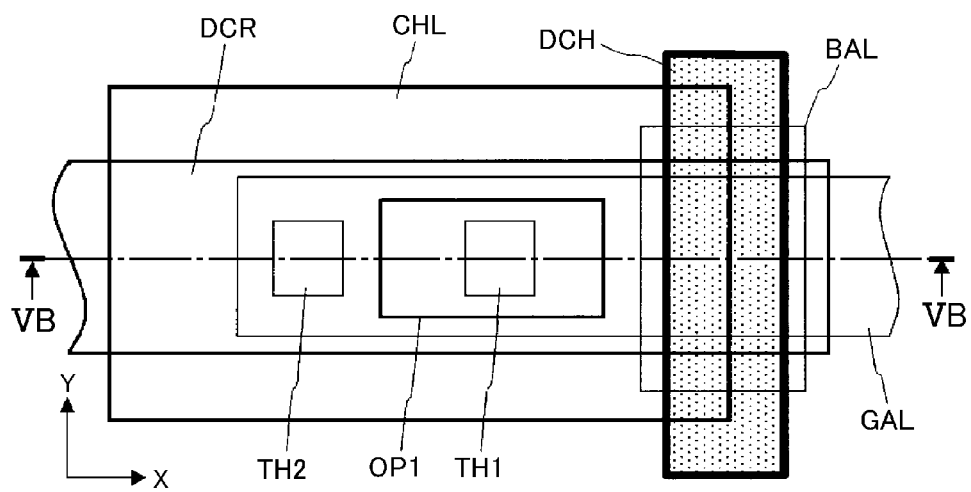
FIG. 5A is a plan view illustrating a schematic configuration of a contact region in a liquid crystal display which is a display device according to a fourth embodiment of the present invention.
Figure 5B:
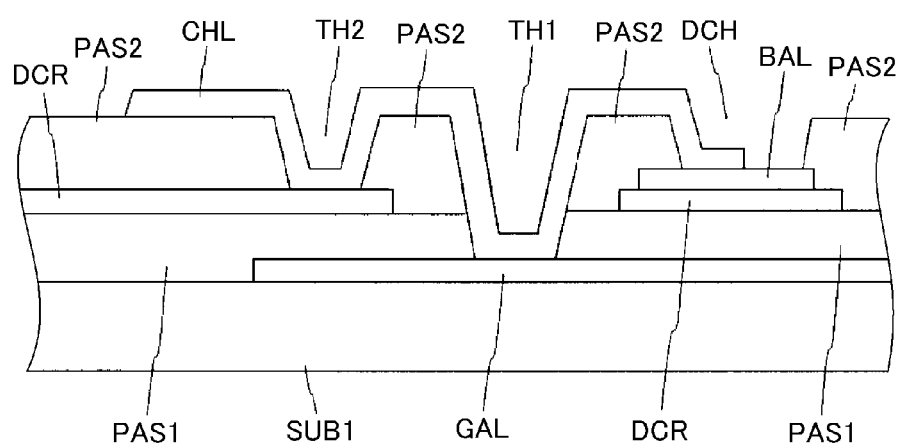
FIG. 5B is a cross-sectional view illustrating a schematic configuration of the contact region in the liquid crystal display which is a display device according to the fourth embodiment of the present invention.

FIGS. 5A and 5B are diagrams illustrating a configuration of a contact region in a liquid crystal display which is a display device according to a fourth embodiment of the present invention, where FIG. 5A is a plan view enlarging the contact region in the liquid crystal display according to the fourth embodiment, and FIG. 5B is a cross-sectional view taken along the line VB-VB shown in FIG. 5A. Here, in the liquid crystal display according to the fourth embodiment, configurations other than a configuration of the scanning signal line DCR and a configuration of the recess portion DCH are the same as those of the liquid crystal display according to the second embodiment. Therefore, configurations of the scanning signal line DCR and the recess portion DCH will be described in detail in the following.

As is clear from FIG. 5A, in the liquid crystal display according to the fourth embodiment, the wire width (Y direction width) of the scanning signal line DCR is formed so as to be larger than the wire width (Y direction width) of the routing wire GAL, and the end portion thereof in the extending direction (X direction) extends to the formation side (the right part in the figure) of the routing wire GAL exceeding the contact region CH. That is to say, the scanning signal line DCR in the fourth embodiment is formed so as to protrude toward the bezel region side where the routing wire GAL is formed, exceeding the barrier layer BAL and the recess portion DCH formed on one end side of the contact region CH.

At this time, in the fourth embodiment as well, the scanning signal line DCR is disposed on the routing wire GAL via the insulating layer PAS1. Therefore, an opening portion OP1 where the scanning signal line DCR is not formed is formed in the region where the connection hole TH1 penetrating to the routing wire GAL through the insulating layers PAS1 and PAS2 is formed, of the regions where the routing wire GAL and the scanning signal line DCR overlap each other. With such a configuration, when the connection holes TH1 and TH2 are formed in the same process, the scanning signal line DCR disposed on the routing wire GAL is prevented from being an etching stopper. That is to say, the connection holes TH1 and TH2 can be formed in the same process.

In addition, in the fourth embodiment, the X direction width of the barrier layer BAL is formed so as to be larger than the X direction width of the recess portion DCH. In addition, the Y direction width of the barrier layer BAL is formed so as to be larger than the wire width of the scanning signal line DCR, and to be smaller than the Y direction width of the transparent conductive film CHL. In addition, the Y direction width of the recess portion DCH is formed so as to be larger than the Y direction width of the transparent conductive film CHL.

With such a configuration, as shown in FIG. 5B, in the liquid crystal display according to the fourth embodiment, the transparent conductive film CHL electrically connects the scanning signal line DCR to the routing wire GAL via the connection hole TH2 which penetrates to the scanning signal line DCR through the insulating layer PAS2 and the connection hole TH1 which penetrates to the routing wire GAL through the insulating layers PAS1 and PAS2.

On the other hand, as shown in the right part of FIG. 5B, the front end portion of the scanning signal line DCR is formed on the insulating layer PAS1, and the barrier layer BAL and the insulating layer PAS2 are formed thereon, in the region where the scanning signal line DCR, the routing wire GAL, and the barrier layer BAL are formed, that is, in the region which is one side in which the end portion of the transparent conductive film CHL is formed and where the recess portion DCH is formed. The recess portion DCH which penetrates to the barrier layer BAL through the insulating layer PAS2 is formed in the insulating layer PAS2, and the end portion of the transparent conductive film CHL, that is, the side edge portion of the transparent conductive film CHL is located on the surface of the barrier layer BAL exposed from the recess portion DCH, that is, on the bottom part of the recess portion DCH.

On the other hand, of the regions where the recess portion DCH is formed, in the region where it does not overlap the barrier layer BAL, the recess portion DCH penetrates to the first substrate SUB1 through the insulating layers PAS1 and PAS2 in the same manner as the above-described first embodiment. Therefore, of the side edge portions of the transparent conductive film CHL overlapping the recess portion DCH, the side edge portion which does not overlap the barrier layer BAL is formed on the surface of the first substrate SUB1 in the same manner as the first embodiment.

As such, in the liquid crystal display according to the fourth embodiment, since the side edge portion of the transparent conductive film CHL close to the connection hole TH1 is formed on the bottom of the recess portion DCH, and the barrier layer BAL is formed at a position overlapping the recess portion DCH, it is possible to achieve the same effects as in the second embodiment.

In addition, although, in the fourth embodiment, the Y direction width of the recess portion DCH is larger than the Y direction width of the transparent conductive film CHL, the present invention is not limited thereto, and the Y direction width of the transparent conductive film CHL may be equal to or more than the Y direction width of the recess portion DCH.

Fifth Embodiment

Figure 6A:
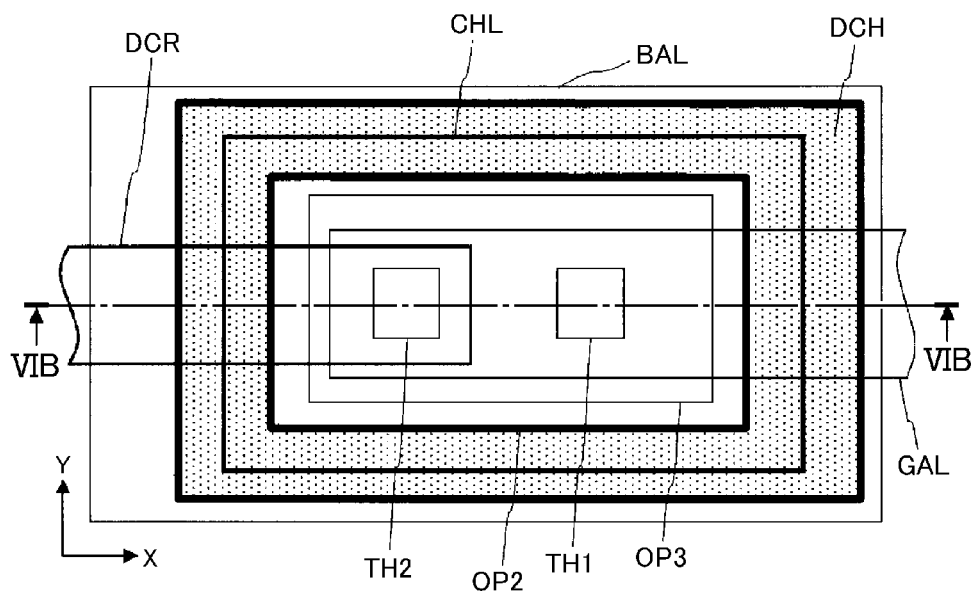
FIG. 6A is a plan view illustrating a schematic configuration of a liquid crystal display which is a display device according to a fifth embodiment of the present invention.
Figure 6B:
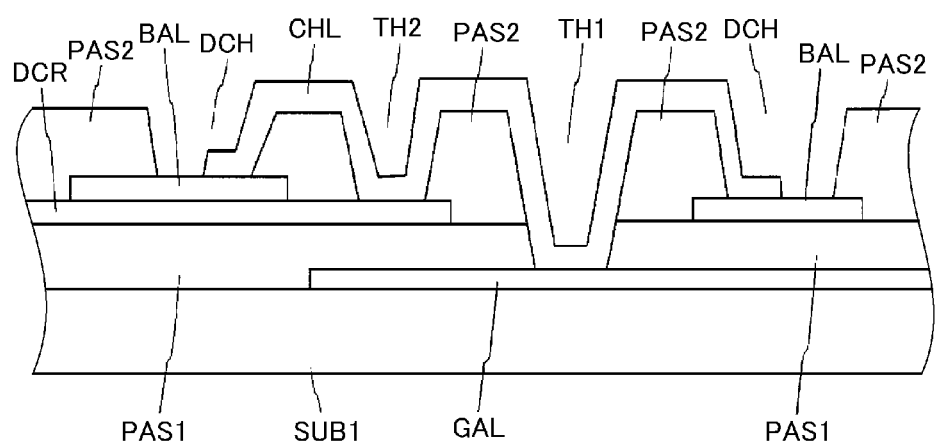
FIG. 6B is a cross-sectional view illustrating a schematic configuration of the liquid crystal display which is a display device according to the fifth embodiment of the present invention.

FIGS. 6A and 6B are diagrams illustrating a configuration of a liquid crystal display which is a display device according to a fifth embodiment of the present invention, where FIG. 6A is a plan view enlarging the contact region in the liquid crystal display according to the fifth embodiment, and FIG. 6B is a cross-sectional view taken along the line VIB-VIB shown in FIG. 6A. Here, in the liquid crystal display according to the fifth embodiment, configurations other than a configuration of the barrier layer BAL and a configuration of the recess portion DCH are the same as those of the liquid crystal display according to the second embodiment. Therefore, configurations of the barrier layer BAL and the recess portion DCH will be described in detail in the following.

As shown in FIG. 6A, in the liquid crystal display according to the fifth embodiment, the ring-shaped rectangular recess portion DCH is disposed in the periphery of the connection holes TH1 and TH2, and surrounds the recess portion DCH and the connection holes TH1 and TH2 in the in-plane direction of the first substrate SUB1. That is to say, in the fifth embodiment, an island-shaped region is formed in the insulating layer PAS2 formed on the scanning signal line DCR, and the connection holes TH1 and TH2 are formed in the island-shaped region. In addition, the shape of the recess portion DCH is not limited to the rectangular shape, and may be other shapes such as a circular shape.

In the liquid crystal display according to the fifth embodiment having such a configuration, of the scanning signal line DCR and the routing wire GAL, the barrier layer BAL is formed on the overlying scanning signal line DCR. At this time, the barrier layer BAL is also formed in a ring-shaped rectangular shape, an opening portion OP3 is formed in the region where the connection holes TH1 and TH2 are formed, and the recess portion DCH is formed so as to overlap the formation region of the barrier layer BAL. That is to say, the Y direction width of the side edge portion on the outer circumferential side (outer edge portion) of the barrier layer BAL is formed so as to be larger than the Y direction width of the outer edge portion of the recess portion DCH, and the X direction width of the barrier layer BAL is formed so as to be larger than the X direction width the outer edge portion of the recess portion DCH. In addition, the side edge portion on the inner circumferential side (inner edge portion) of the barrier layer BAL, that is, the Y direction width of the opening portion OP3 is formed so as to be smaller than the Y direction width of the inner edge portion (opening portion) OP2 of the recess portion DCH, and the inner edge of the barrier layer BAL, the X direction width of the opening portion OP3 is formed so as to be smaller than the inner edge portion of the recess portion DCH, that is, the X direction width of the opening portion OP2.

In addition, in the fifth embodiment, the side edge portion of the transparent conductive film CHL is formed in the region of the recess portion DCH. That is to say, the Y direction width of the transparent conductive film CHL is formed so as to be smaller than the Y direction width of the outer edge portion of the recess portion DCH and to be larger than the Y direction width of the inner edge portion of the recess portion DCH, and the X direction width of the transparent conductive film CHL is formed so as to be smaller than the X direction width of the outer edge portion of the recess portion DCH and to be larger than the X direction width of the inner edge portion of the recess portion DCH.

At this time, in the liquid crystal display according to the fifth embodiment, as shown in FIG. 6B, the scanning signal line DCR is formed on the insulating layer PAS1, then the barrier layer BAL is formed thereon, and the insulating layer PAS2 is formed on the barrier layer BAL. Next, the connection holes TH1 and TH2 and the recess portion DCH are formed in the insulating layer PAS2, and thereby, in the region where the recess portion DCH is formed such that the scanning signal line DCR and the recess portion DCH overlap each other, as shown in the left part of the figure, the recess portion DCH which penetrates to the overlying barrier layer BAL of the scanning signal line DCR through the insulating layer PAS2. In addition, in the formation regions of the recess portion DCH except for the region where the scanning signal line DCR and the recess portion DCH overlap each other, as shown in the right part of the figure, the recess portion DCH which penetrates to the barrier layer BAL through the insulating layer PAS2 is formed.

As a result, the transparent conductive film CHL which electrically connects the scanning signal line DCR to the routing wire GAL via the connection holes TH1 and TH2 is formed on the insulating layer PAS2 formed in an island shape, and the side edge portion thereof is disposed on the surface of the barrier layer BAL, that is, the bottom of the recess portion DCH.

As described above, in the liquid crystal display according to the fifth embodiment, the side edge portion of the transparent conductive film CHL is formed on the bottom of the ring-shaped recess portion DCH surrounding the connection holes TH1 and TH2. Therefore, the step difference in the normal direction of the first substrate SUB1 is formed in the permeation path of impurities from the side edge portion of the transparent conductive film CHL to the connection holes TH1 and TH2 including the permeation pass of impurities from the side edge portion of the transparent conductive film CHL located close to the side edge portion side of the first substrate SUB1 to the connection hole TH1, and thus it is possible to make the permeation path complicated. As a result, even if an impurity such as moisture permeates from the side edge portion of the first substrate SUB1, the permeating impurity such as moisture can be prevented from easily reaching the connection holes TH1 and TH2 from between the conductive thin film CHL and the underlying thin film thereof and thus the routing wire GAL can be prevented from being corroded in the formation parts of the connection holes TH1 and TH2. Therefore, it is possible to improve the reliability of the contact region CH, and, as a result, it is possible to improve the reliability of the liquid crystal display.

In the liquid crystal display according to the fifth embodiment as well, since the recess portion DCH is also formed in a process for forming the connection holes TH1 and TH2, only the insulating layer PAS2 is etched through etching for forming the recess portion DCH and the underlying scanning signal line DCR is not exposed, by providing the barrier layer BAL in the fifth embodiment. Therefore, since the recess portion DCH can be formed so as to overlap the scanning signal line DCR and the routing wire GAL in the region where the recess portion DCH is formed, in the same manner as the second embodiment, it is possible to prevent the contact region from being expanded in the Y direction due to the formation of the recess portion DCH without making the routing wire GAL bypass in the Y direction due to the formation of the recess portion DCH.

In addition, although, in the liquid crystal display according to the fifth embodiment, the insulating layer PAS1 is not etched by forming the ring-shaped barrier layer BAL, the present invention is not limited thereto. For example, of the recess portions DCH formed at four side edge portions of the transparent conductive film CHL, the barrier layer BAL may be provided in the recess portions DCH formed at two side edge portions intersecting the scanning signal line DCR which is a signal line and the routing wire GAL in an overlapping manner. In this case, in the region where the barrier layer BAL is not formed, the recess portion DCH penetrates to the first substrate SUB1 through the insulating layers PAS1 and PAS2, and the side edge portion of the transparent conductive film CHL is located on the surface of the first substrate SUB1.

Sixth Embodiment

Figure 7A:
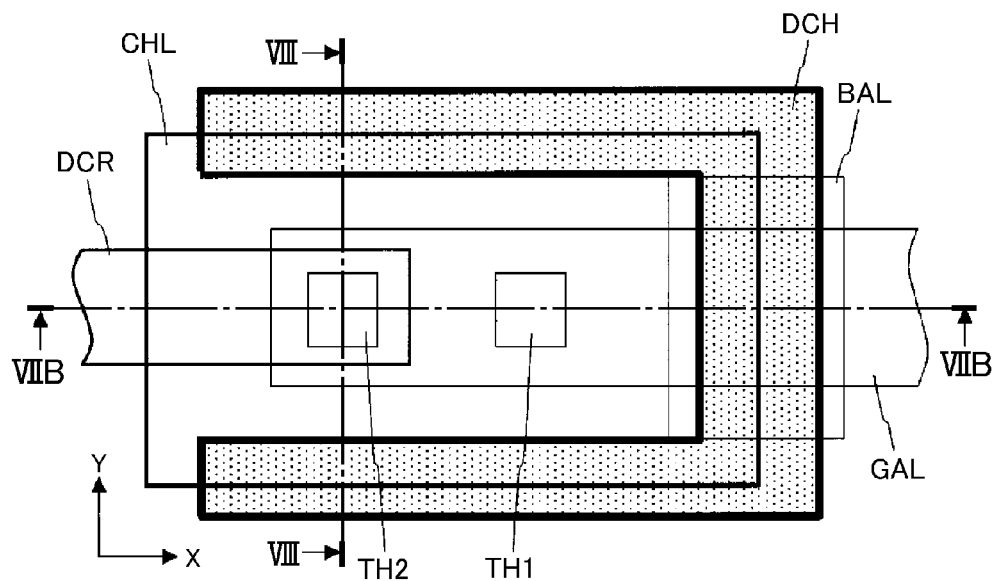
FIG. 7A is a plan view illustrating a schematic configuration of a liquid crystal display which is a display device according to a sixth embodiment of the present invention.
Figure 7B:
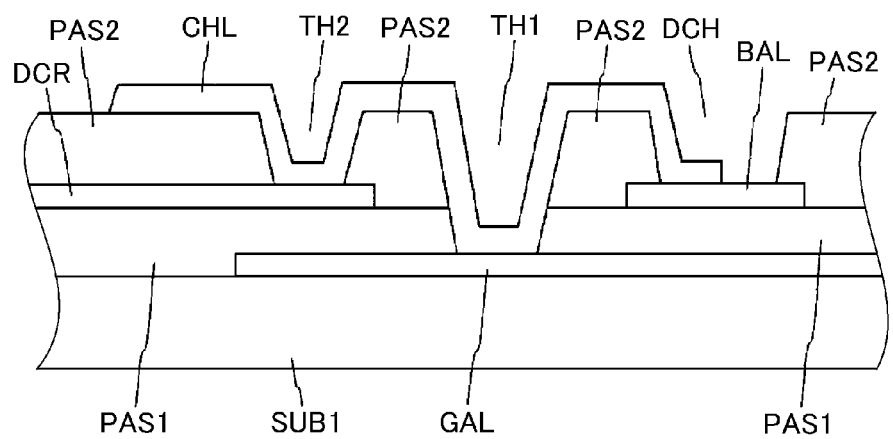
FIG. 7B is a cross-sectional view illustrating a schematic configuration of the liquid crystal display which is a display device according to the sixth embodiment of the present invention.
Figure 8:
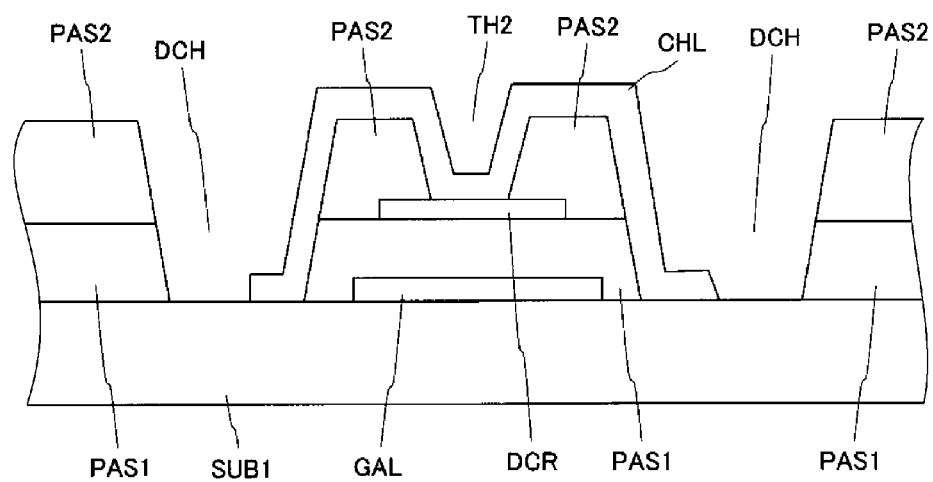
FIG. 8 is a cross-sectional view taken along the line VIII-VIII shown in FIG. 7A.

FIGS. 7A and 7B are diagrams illustrating a schematic configuration of a liquid crystal display which is a display device according to a sixth embodiment of the present invention, where FIG. 7A is a plan view enlarging the contact region in the liquid crystal display according to the sixth embodiment, and FIG. 7B is a cross-sectional view taken along the line VIIB-VIIB shown in FIG. 7A. FIG. 8 is a cross-sectional view taken along the line VIII-VIII shown in FIG. 7A. Here, in the liquid crystal display according to the sixth embodiment, configurations other than a configuration of the recess portion DCH are the same as the configurations of the liquid crystal display according to the second embodiment. Therefore, a configuration of the recess portion DCH will be described in detail in the following.

As shown in FIG. 7A, in the liquid crystal display according to the sixth embodiment, in the in-plane direction of the first substrate SUB1, the recess portion DCH is open on the scanning signal line DCR side which is a signal line disposed at the upper layer, so as to have a C shape (U shape). That is to say, in the liquid crystal display according to the sixth embodiment, of four side edge portions of the transparent conductive film CHL, the recess portion DCH is formed in three side edge portions of the transparent conductive film CHL except for the side edge portion which is the farthest from the side edge portion of the first substrate SUB1.

In the same manner as the fourth embodiment, on the right part of the figure intersecting the routing wire GAL which is a signal line, the barrier layer BAL with the width larger than the X direction width of the recess portion DCH is formed in the recess portion DCH having such a configuration; the recess portion DCH is formed so as to overlap the barrier layer BAL; and the routing wire GAL is formed so as to overlap the barrier layer BAL.

With such a configuration, as shown in FIG. 7B, in the same manner as the fourth embodiment, the insulating layer PAS1 formed on the routing wire GAL is left and only the insulating layer PAS2 is etched in the region where the routing wire GAL is formed. That is to say, the recess portion DCH penetrates to the barrier layer BAL through the insulating layer PAS2 so as to expose the upper surface of the barrier layer BAL, and the side edge portion of the transparent conductive film CHL is disposed on the exposed upper surface of the barrier layer BAL.

On the other hand, in the recess portions DCH of the upper and lower parts of the figure, in the recess portion DCH where the routing wire GAL is not formed, as shown in FIG. 8, the barrier layer BAL is not formed on the insulating layer PAS1, and thus the insulating layers PAS1 and PAS2 are all etched through etching when forming the recess portions DCH along with the connection holes TH1 and TH2. Therefore, the recess portions DCH penetrate to the first substrate SUB1 through the insulating layers PAS1 and PAS2. As a result, the side edge portions of the transparent conductive film CHL are located on the surfaces of the first substrate SUB1 exposed from the recess portions DCH, that is, the bottoms of the recess portions DCH.

As such, in the liquid crystal display according to the sixth embodiment, of the four side edge portions of the transparent conductive film CHL which electrically connects the scanning signal line DCR to the routing wire GAL via the connection holes TH1 and TH2, three side edge portions except for the side edge portion which is the farthest from the side edge portion of the first substrate SUB1 are formed on the surface of the barrier layer BAL or the surface of the first substrate SUB1, that is, the bottom of the recess portion DCH. Therefore, in addition to the effects achieved by the second embodiment, it is possible to achieve an exceptional effect of preventing impurities which bypass the formation part of the recess portion DCH and permeate from the upper and lower side edge portions of the transparent conductive film CHL, and thus it is possible to further improve the reliability of the contact region and the liquid crystal display.

Seventh Embodiment

Figure 9:
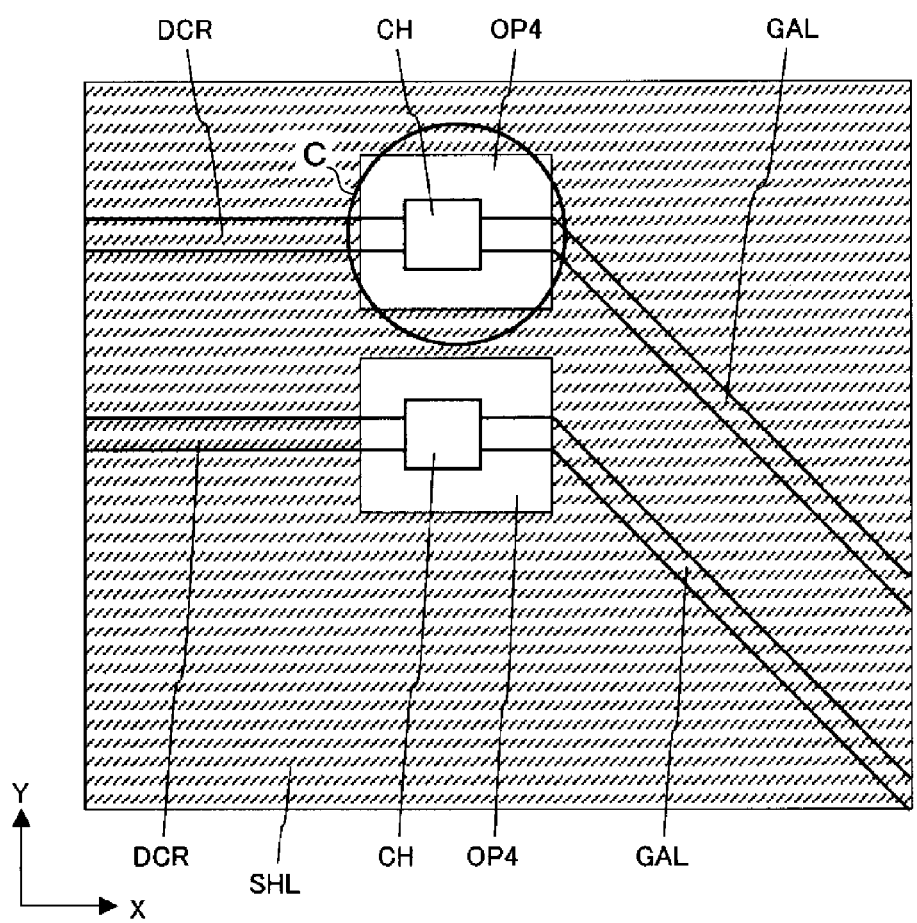
FIG. 9 is a diagram illustrating a positional relationship between a scanning signal line and a routing wire in a liquid crystal display which is a display device according to a seventh embodiment of the present invention.
Figure 10A:
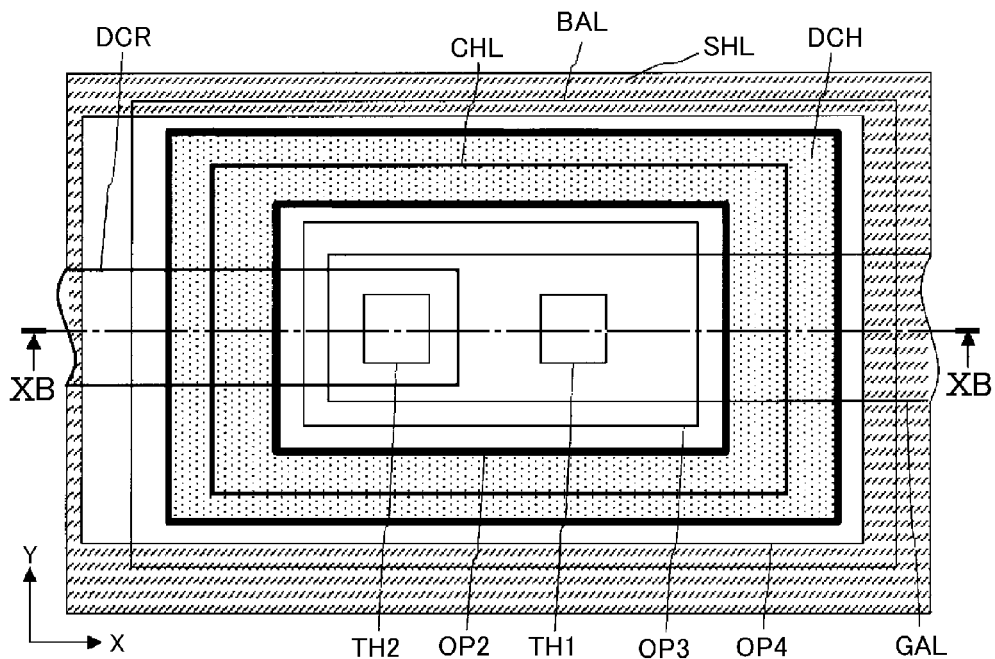
FIG. 10A is a plan view illustrating a schematic configuration of a contact region in a liquid crystal display according to a seventh embodiment of the present invention.
Figure 10B:
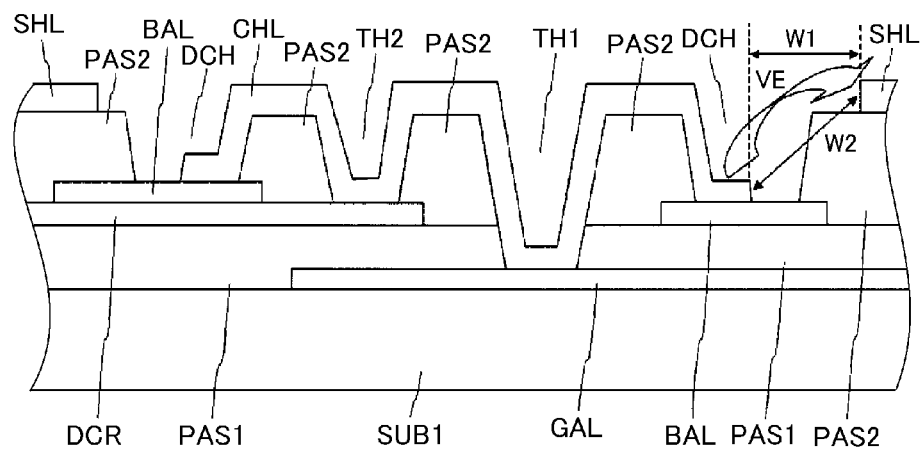
FIG. 10B is a cross-sectional view illustrating a schematic configuration of the contact region in the liquid crystal display according to the seventh embodiment of the present invention.
Figure 11A:
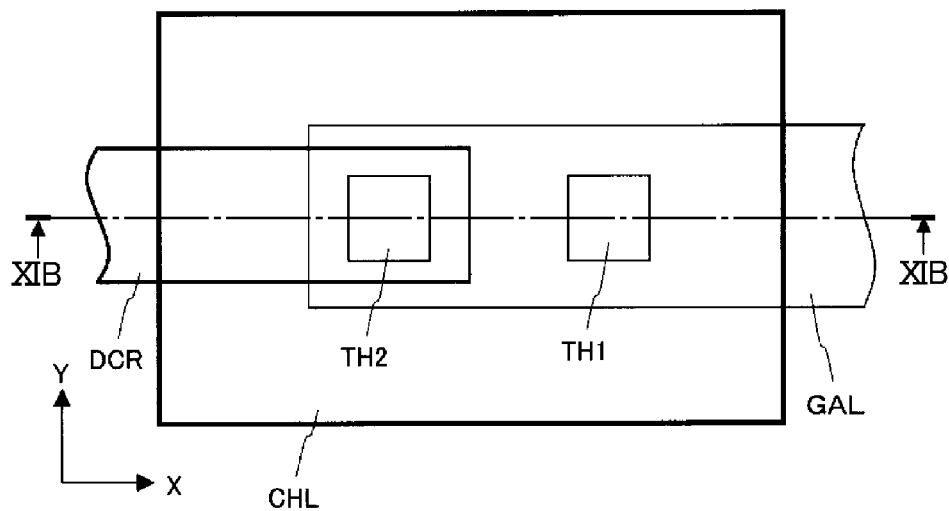
FIG. 11A is a plan view illustrating a schematic configuration of a contact region in a liquid crystal display in the related art.
Figure 11B:
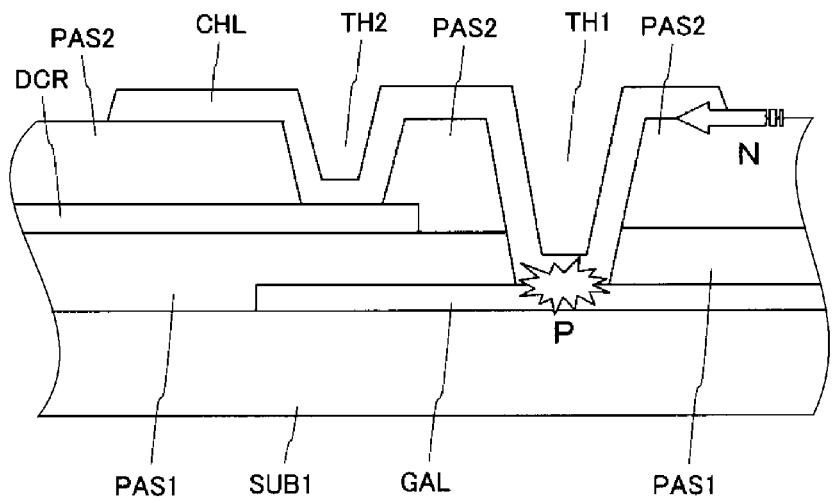
FIG. 11B is a cross-sectional view illustrating a schematic configuration of the contact region in the liquid crystal display in the related art.

FIG. 9 is a diagram illustrating a positional relationship between a scanning signal line and a routing wire in a liquid crystal display which is a display device according to a seventh embodiment of the present invention, and FIGS. 10A and 10B are diagrams illustrating a schematic configuration of a contact region in the liquid crystal display according to the seventh embodiment of the present invention. FIG. 10A is a plan view enlarging the contact region (C part in FIG. 9) formed on the first substrate, and FIG. 10B is a cross-sectional view taken along the line XB-XB shown in FIG. 10A. Here, in the liquid crystal display according to the fifth embodiment, configurations other than a configuration of a transparent conductive film for shield (hereinafter, referred to as a shield film SHL) are the same as those of the liquid crystal display according to the seventh embodiment. Therefore, the shield film SHL will be described in detail in the following.

As shown in FIG. 9, in the liquid crystal display according to the seventh embodiment, the shield film SHL which is a transparent conductive film for the shield is formed on an opposite surface side to the first substrate SUB1, that is, a side where the liquid crystal is disposed. The shield film SHL, as described later in detail, is formed at the same layer as a transparent conductive film formed, that is, to be an upper layer of the insulating layer PAS2, and is supplied with a voltage with the same potential as the common electrode. Therefore, an opening portion OP4 where the shield film SHL is not formed is formed at a position corresponding to the contact region CH so as to prevent the transparent conductive film CHL which is formed in the contact region from being short-circuited to the shield film SHL.

In addition, as shown in FIG. 10A, the shield film SHL denoted by the diagonal lines is formed on the periphery of the contact region CH, and the contact region CH according to the seventh embodiment is formed in the opening portion OP4 formed in the shield film SHL. That is to say, the dotted ring-shaped recess portion DCH is formed at the inside region of the opening portion OP4 formed in the in-plane direction of the first substrate SUB1, and the side edge portion of the transparent conductive film CHL is located in a region between the outer edge portion and the inner edge portion of the recess portion DCH, that is, on the surface of the barrier layer BAL.

In the transparent conductive film CHL with this configuration, in the same manner as the fifth embodiment, as shown in FIG. 10B, the transparent conductive film CHL which electrically connects the scanning signal line DCR to the routing wire GAL via the connection holes TH1 and TH2 is formed to be an upper layer of the insulating layer PAS2 formed in an island shape, and the side edge portion thereof is disposed on the surface of the barrier layer BAL, that is, the bottom of the recess portion DCH, in the region of the opening portion OP4 of the shield film SHL. That is to say, the side edge portion of the transparent conductive film CHL is formed on the bottom of the ring-shaped recess portion DCH surrounding the connection holes TH1 and TH2, and thus it is possible to achieve the same effects as in the liquid crystal display according to the fifth embodiment.

In addition, in the liquid crystal display according to the seventh embodiment, since the side edge portion of the transparent conductive film CHL is formed on the bottom of the recess portion DCH, it is possible to increase the distance W2 between the side edge portion of the transparent conductive film CHL and the side edge portion of the opening portion OP4 of the shield film SHL without increasing the distance (gap) W1 in the in-plane direction of the first substrate SUB1.

Therefore, since the electric field intensity of the electric field VE applied between the transparent conductive film CHL and the shield film SHL can be reduced, it is possible to decrease the electric field intensity between the transparent conductive film CHL and the shield film SHL. As a result, it is possible to achieve an exceptional effect that deterioration in the transparent conductive film CHL can be considerably reduced. In addition, since it is possible to considerably reduce permeation of impurities such as moisture according to the deterioration in the transparent conductive film CHL, it is possible to achieve an exceptional effect that the reliability of a liquid crystal display can be further improved.

In addition, in a case where an organic insulating layer which functions as a planarization film and is an insulating layer made of an organic material is used as the insulating layer PAS2, the insulating layer PAS2 has a film thickness which is much larger than that of the insulating layer PAS1 which generally uses an insulating layer made of an inorganic material. Therefore, it is possible to considerably enlarge the gap W2 between the side edge portion of the transparent conductive film CHL and the side edge portion of the opening portion OP4 of the shield film SHL by forming the side edge portion of the transparent conductive film CHL of the recess portion DCH on the bottom, and thus it is possible to further improve the reliability. In addition, since it is possible to considerably enlarge the gap W2 between the side edge portion of the transparent conductive film CHL and the side edge portion of the opening portion OP4 of the shield film SHL, the gap W1 in the in-plane direction can be reduced. Therefore, it is possible to achieve an exceptional effect of improving reliability and accomplishing a narrow bezel for decreasing the width of the bezel region.

Particularly, the reason is as follows. Since the thin film transistor TFT formed on the transparent substrate (first substrate SUB1) constituting a display device has a driving voltage higher than that of a transistor constituting a driving circuit, a voltage of the scanning signal applied to the scanning signal line DCR is also increased, and thus a voltage difference with the scanning signal applied to the shield film SHL and the scanning signal line DCR which maintain the same potential as the common electrode is increased. In turn, a potential difference between the transparent conductive film CHL and the shield film SHL is also increased, thereby increasing the electric field WE, resulting in increasing a deterioration progress degree.

In addition, although the configuration of the fifth embodiment is used as the configuration of the recess portion DCH in the liquid crystal display according to the seventh embodiment, the present invention is not limited thereto, configurations of the recess portion DCH of other embodiments may be used. In this case as well, this is because it is possible to prevent deterioration in the side edge portion of the transparent conductive film CHL which is disposed closest to the side edge portion of the first substrate SUB1.

In addition, although the insulating layers PAS1 and PAS2 are etched to form the recess portion DCH in the first to seventh embodiments, the present invention is not limited thereto, and, for example, there may be a configuration where a thin film layer for generating a step difference is formed on and/or under the insulating layers PAS1 and PAS2, the step difference including concaves and convexes are formed on the surface of the insulating layer PAS2 as the recess portion DCH, and the side edge portion of the transparent conductive film CHL is disposed on a bottom of the step difference. Particularly, in a case where an organic insulating layer or the like functioning as a planarization film is not used as the insulating layer PAS2, but an inorganic insulating layer made of an inorganic material is used, it is possible to easily form a step difference on the surface of the insulating layer PAS2.

In addition, although a case where the present invention is applied to a contact region has been described in the liquid crystal display according to the first to seventh embodiments, the present invention is not limited thereto. For example, the present invention is applicable to a case where a routing wire is formed as multiple layers, and is electrically connected to a scanning signal lines via a transparent conductive film.

As described above, although the invention made by the present inventor has been described in detail based on the embodiments of the invention, the present invention is not limited to the embodiments of the invention, but may have various modifications within the scope without departing from the spirit thereof.

What is claimed is:

1. A display device comprising:
    a display region where display pixels are arranged in a matrix on a substrate;
    a terminal section that is disposed at a side portion of the substrate; and
    signal lines that are disposed via a region between the display region and a side edge portion of the substrate and electrically connect the display pixels to the terminal section,
    wherein the signal lines include a first signal line formed close to the side edge of the substrate, a second signal line formed on the first signal line via a first insulating film, and a transparent conductive film formed on the second signal line via a second insulating layer and electrically connecting the first signal line to the second signal line, wherein the transparent conductive film is formed so as to cover a first connection hole which penetrates to the first signal line through the first insulating layer and the second insulating layer and a second connection hole which penetrates to the second signal line through the second insulating layer, wherein a recess portion is formed in the first insulating layer and/or the second insulating layer, and wherein the recess portion is disposed between the connection hole close to the side edge portion of the substrate of the first and second connection holes, and the side edge portion of the substrate, and at least a part of the side edge portion of the transparent conductive film extends to a bottom of the recess portion, wherein the display device further comprising:

a barrier layer that is formed on the first insulating layer so as to overlap the recess portion, and wherein the first signal line and/or the second signal line intersect(s) the recess portion in a region where the barrier layer is formed.

2. The display device according to claim 1, wherein the recess portion extends in a direction of the side edge portion of the transparent conductive film closest to the side edge portion of the substrate, of the side edge portions of the transparent conductive film.

3. The display device according to claim 1, wherein the recess portion is formed along one side of the transparent conductive film.

4. The display device according to claim 1, wherein one of the first signal line and the second signal line, connected to the transparent conductive film via the connection hole close to the recess portion, is disposed so as to bypass a formation position of the recess portion, and wherein the recess portion penetrates through the first insulating layer and the second insulating layer.

5. The display device according to claim 1, wherein the side edge portions of the transparent conductive film include a first side where the first signal line or the second signal line, distant from the side edge portion of the substrate, is disposed, and a second side excluding the first side, and wherein the recess portion is formed along the second side, and each of the side edge portions of the transparent conductive film extends to the bottom of the recess portion.

6. The display device according to claim 1, wherein the recess portion is formed in a ring shape along all the side edge portions of the transparent conductive film, and each of the side edge portions of the transparent conductive film extends to the bottom of the recess portion.

7. The display device according to claim 6, wherein the barrier layer is formed in a ring shape along the recess portion.

8. The display device according to claim 1, wherein the first signal line and the second signal line are formed so as to intersect the recess portion, and wherein the second signal line has an opening portion with an opening width smaller than a signal line width, and the first connection hole is formed in a region of the opening portion.

9. The display device according to claim 1, further comprising:

a shield film that is formed on the second insulating layer and has an opening portion in a formation region of the transparent conductive film, Wherein the recess portion is formed inside an opening region of the opening portion, and wherein an end portion of the shield film does not overlap a side edge portion of the recess portion.

10. The display device according to claim 1, wherein the recess portion is formed in the same process as the first connection hole and the second connection hole.

11. The display device according to claim 1, wherein the first signal line and/or the second signal line are (is) formed of a metal thin film.

12. The display device according to claim 1, wherein the first signal line is formed between the display region and the side edge portion of the substrate, and the second signal line is formed in the display region.

13. The display device according to claim 1, further comprising:

an opposite substrate that is disposed so as to be opposite to the substrate via a liquid crystal layer.

* * * * *